Dec. 8, 1964 T. F. K. EDMISON 3,160,369
FLIGHT PATH CONTROL SYSTEM
Filed July 5, 1961 3 Sheets-Sheet 1

INVENTOR
T. F. K. Edmison
BY Moore & Hall
ATTORNEYS

Dec. 8, 1964     T. F. K. EDMISON     3,160,369

FLIGHT PATH CONTROL SYSTEM

Filed July 5, 1961     3 Sheets-Sheet 2

INVENTOR

T. F. K. Edmison

BY

ATTORNEYS

Dec. 8, 1964  T. F. K. EDMISON  3,160,369
FLIGHT PATH CONTROL SYSTEM
Filed July 5, 1961  3 Sheets-Sheet 3

INVENTOR
T. F. K. Edmison
BY Moore & Hall
ATTORNEYS 3,160,369
FLIGHT PATH CONTROL SYSTEM
Thomas F. K. Edmison, P.O. Box 128, Dartmouth,
Nova Scotia, Canada
Filed July 5, 1961, Ser. No. 121,933
17 Claims. (Cl. 244—77)

The present invention relates to systems adapted to generate and detect signals defining a flight path for final approach of an aircraft toward a landing location or runway; and is more particularly concerned with an improved system of the type described, adapted to provide reliable, accurate control information for aircraft final approach, flare-out, decrab if necessary, touch-down and roll-out, with designed variable control sensitivity as may be required in particular installations.

Various arrangements have been suggested heretofore for providing information permitting instrument or automatic approach along a flight path toward an aircraft runway. The standard so-called ILS system defines a flight path through the provision of amplitude balance between four components of radiated signal, with this balance being determined by adjustment of ground transmitter power, antenna characteristics, the characteristics of propagation and reflection, and adjustment of an airborne receiver-detector. The operation of an ILS system is, however, as is known in the art, subject to irregularities which produce "bumps," "bends" and erratic signals, in the final stages of approach near the ground and close to the runway. As a result, ILS systems find their greatest utility in controlling aircraft through initial approach and down to 200 to 300 feet from the ground.

In an effort to avoid some of these known difficulties of ILS and similar such radio or radar systems, alternative arrangements have been suggested for defining glide paths in the region of touchdown. A typical such arrangement contemplates the provision of cable systems extending outward from the center of the runway, or along opposite sides of the runway, and providing magnetic or other fields intended to be monitored by instrumentation on the aircraft, and defining an approach path when used in conjunction with average attitude calculators and radio altimeters for final approach and flare-out.

Typical cable systems suggested heretofore, however, have been subject in themselves to a number of disadvantages. It has been found, for example, that massive bodies of high conductivity in the immediate vicinity of the cables, e.g. power conduits, water mains, etc., tend to distort the fields produced by the cables thereby causing errors and irregularities in the approach path information. Moreover, the cable arrangements suggested heretofore, e.g. when two cables extending along opposite sides of the runway are employed, have contemplated a cable disposition wherein the cable flare outwardly away from one another or are otherwise disposed in a symmetrical arrangement relative to opposite sides of the runway; and this required disposition of the cables has in turn greatly limited their possible usage due to the existence of natural barriers, unavailability of real estate, etc., in the vicinity of the aircraft runway (approach) through which said cables had to be laid. Moreover, such cable systems have only provided lateral or azimuth guidance and have had to be used in conjunction with average attitude calculators and radio altimeters for any height or glide path guidance. Therefore, systems of the ILS type have continued to be the most prevalent form of approach control, notwithstanding the difficulties exhibited by such system in final stages of approach.

The present invention, recognizing these difficulties, is accordingly concerned with a control system adapted to give highly reliable localizer and glide path information in final stages of approach, flare-out, touchdown and roll-out, having made use of ILS radar or other systems for initial approach. The present invention is more especially concerned with providing such more reliable information by an arrangement which obviates the disadvantages characteristic of ILS (close to the runway) and of the cable systems suggested heretofore.

In providing for the foregoing operation, the present invention contemplates the provision of a pair of elongated loops extending along the side of and away from the end of a runway to the approach area of said runway. As will appear hereinafter, each said loop comprises, in essence, a pair of elongated cables disposed in an endless configuration; and each said loop may in turn be disposed at varying positions along its extension whereby said loops need not be symmetrical relative to one another. The loops are each, in their directions of extension, caused to be mounted at a slant angle to a fixed horizontal, or ground level; and the slant angle of said loops is varied along the length of each said loop for reasons which will appear hereinafter. The pair of loops are moreover energized by realtive low frequency sources, and at different frequencies, thereby to produce two magnetic induction fields at said different frequencies. These induction fields are in turn intercepted, on the aircraft, by a pair of pick-up loops mounted at right angles to one another and maintained gyrostabilized, so that one loop is horizontal and the other loop is vertical notwithstanding maneuvers which may be required of the aircraft during approach and landing. The disposition of ground loops, constantly varying in slant angle along their lengths and in relation to one another, and cooperating with their respective sources of energization, cause a flight path to be defined in space characterized by a succession of double nulls when detected by the aforementioned two aircraft gyrostabilized pick-up loops; and as the aircraft deviates from the double null flight path, characteristic signals are generated in the aircraft which indicate whether said deviation is above or below, or to the right or left of the desired flight path, whereby corrections in the approach path of the aircraft can be effected either manually or automatically.

Due to the fact that the desired flight path is defined by reason of varying slant angles of the loops as well as by the relative disposition of said loops along their directions of length, the loops can be premounted at varying positions in or on the ground, and can be so mounted as to take into account and compensate for any possible disturbing influences, topographical obstacles, or real estate limitations which might otherwise tend to distort the flight path. Moreover, by appropriate attention to the initial installation of the loops, the flight path can be variously defined to cause a normal approach angle, a flare-out where required and actual touchdown and lateral control on the runway, which is far more precise and far more easily detected and monitored than has been possible in arrangements suggested heretofore.

The dimension of loop extension and spread depends on the local conditions of application. If used with ILS, control of approach may be transferred to the system of the present invention where (because of local conditions) the ILS deteriorates to an unsatisfactory performance due to topographical conditions, type of soil, etc. near the ground. Regardless of the configuration of any installation of this system, the flight path is adjusted by adjusting the horizontal tilt of each ground loop. This is done (in varying degree) along the length of the loops to produce the null coincidence at the desired point in space as seen by a gyro-stabilized horizontal pick-up loop at that point. In some locations, due to availability of suitable land and the relatively low cost of installation, it may be desirable to run the ground loops out for as much as three to five miles, and to use a simplified homing beacon system (H facility) as an initial guidance system, thus eliminating the cost of an ILS or radar. On the other hand, with proximity of urban built-up areas, or difficult rocky terrain, the loop coverage may be reduced to a minimum, providing high accuracy guidance for the last two, three, or four hundred feet of descent, extending out to the limit of approach lights, for example.

It is accordingly an object of the present invention to provide an improved system defining a flight path at locations relatively close to point of touchdown and adapted to supersede controlled approach systems such as ILS in certain locations, or to take over from such systems during final stages of an aircraft approach and landing.

A further object of the present invention resides in the provision of a system adapted to provide reliable, accurate control data usable by an aircraft in making its final approach; and designed, in providing such data, to automatically provide information relating to flare-out, de-crab if necessary, touchdown and roll-out of said aircraft during a landing operation.

A still further object of the present invention resides in the provision of an improved system affording flight path information, and utilizing a novel disposition of loops adapted to permit a pair of said loops to be variously located relative to a runway while still providing information regarding a particular desired flight path.

A still further object of the present invention resides in the provision of an improved flight path system utilizing cable loops oriented at an angle to the horizontal, and variably so oriented to provide a flight path characterized by two nulls detectable by a horizontal pick-up loop in space.

A still further object of the present invention resides in the provision of a system generating flight path information relative to a runway and adapted to define a flight path in space which may, if desired, include maneuver information adapted to effect approach over a relatively complex path toward the end of a runway.

Still another object of the present invention resides in the provision of a system utilizing a pair of induction fields to define flight path information, cooperating with receiving equipment on an aircraft adapted to automatically maintain said craft on the flight path and/or adapted to automatically correct the position of said aircraft when it falls above or below and/or to the right or left of the desired flight path.

Still another object of the present invention resides in the provision of an improved system adapted to establish in space a predetermined induction magnetic field having a flight or approach path defined therein by double nulls, with the location of said nulls, and therefore of said flight path, being related to various geometric principles whereby the resulting system is far simpler and more reliable in operation than other systems suggested heretofore.

The foregoing objects, advantages, construction and operation of the present invention will become more readily apparent from the following description and accompanying drawings in which.

The system to be described hereinafter produces error signals adapted to be received and utilized in conjunction with known types of instrumentation and control, such as the Weston ID 48 cross pointer indicator, the "Zero Reader" manufactured by the Sperry Rand Corporation, or the "Integrated Flight System" manufactured by Collins Radio. Moreover, as will appear hereinafter, the signals generated in accordance with the present invention may in fact be employed in conjunction with many other airborne systems designed to work from control signals of the type provided by the international standardized ILS systems, as well as with automatic pilot equipment. The system provides error signals which are indeed substantially identical with the error signals provided by ILS; and the significant difference between the two systems lies in the source of the signals so generated.

In accordance with the present invention, the defined flight path is generated on the basis of geometrical relationships between a pair of driven loop inductors disposed on or in the ground and extending outwardly from and adjacent to opposite sides of a runway. Such loops have been illustrated in FIGURES 1, 2 and 8; and the loops have been designated, in FIGURES 2 and 8, as 10 and 11 respectively, while the runway has been designated 12. The said loops are, as will become apparent from the subsequent discussion, energized respectively by two different frequencies $f_1$ and $f_2$ whereby induction fields are produced in surrounding relation to the loops 10 and 11, and in predetermined relationship to pickup loops disposed within the induction field of said ground loops 10 and 11 and located on an aircraft. The phase of the current in the ground loops has, by reason of certain considerations to be discussed, no effect on the system performance. Variations in amplitude of the current in the loops will have some effect on the linearity of error signals produced in the aircraft when the aircraft deviates from a desired null condition. The null or flight path condition, however, is not effected by any such unbalance of amplitude, wherefore an aircraft, once it reaches the null position characteristic of a desired flight path, can be certain that it is properly located on the flight path.

These factors, plus the high simplicity of the equipment involved, render the system far more accurate and reliable for the control of final stages of aircraft approach and landing than have been possible heretofore; and those parameters which tend to disrupt standard ILS during final approach phases of a landing operation are, as will appear, rendered relatively unimportant. As a result, the overall system of the present invention can be used in conjunction with a standard ILS system or indeed in conjunction with a simplified homing beacon system to provide initial guidance for an aircraft at a region three to five miles away from a landing location; and the loop system of the present invention can thereafter take over to provide high precision information during the final phases of approach, flare-out, landing, and roll-out, i.e. during the last two to four hundred feet of descent, and landing.

Figures 1, 2, 3A, 3B, 4, 5:
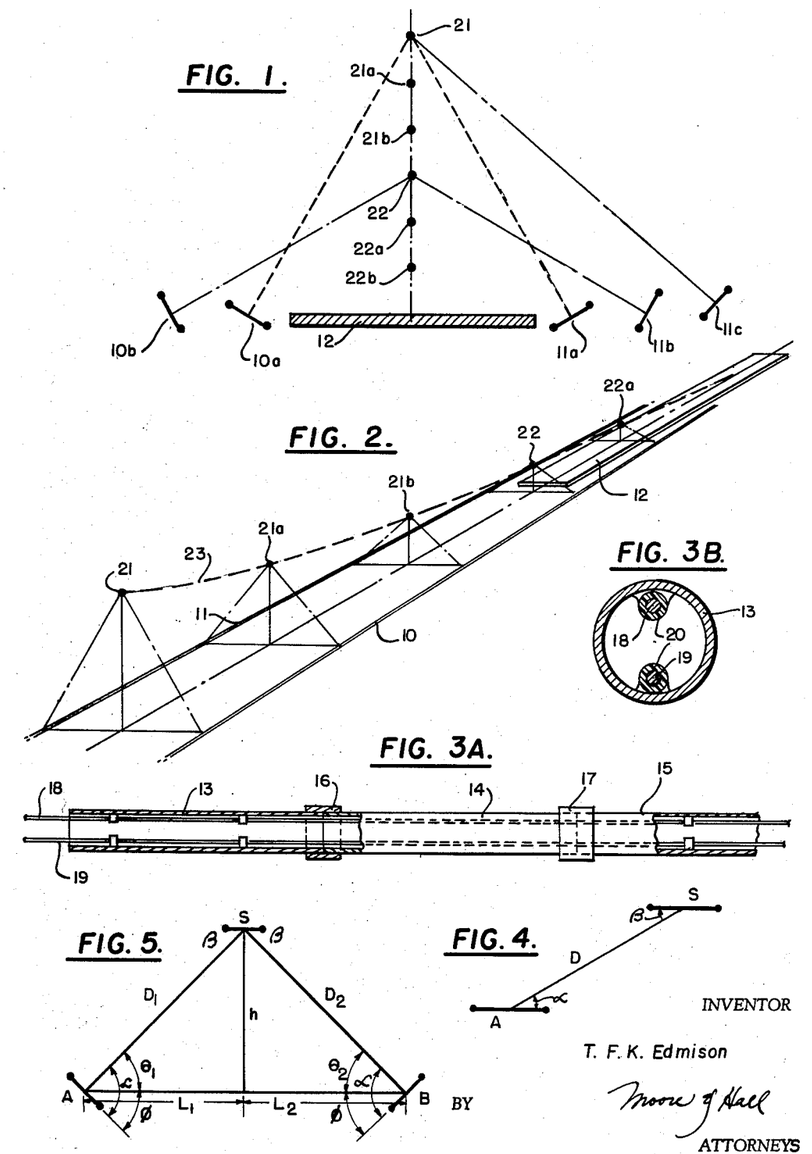
FIGURE 1 is an illustrative diagram showing certain principles employed in the present invention for defining a flight path relative to a runway.
FIGURE 2 is a perspective illustrative view showing one form of flight path which may be generated by the apparatus of the present invention.
FIGURES 3A and 3B are cross-sectional views of a cable loop system such as may be employed in cooperation with a runway for defining a flight or approach path.
FIGURES 4–7 inclusive, comprise illustrative vector diagrams showing the operation of the present system in generating a flight path and in producing error information indicating the location of an aircraft above or below, or to the right or left of the desired flight path.

The loops 10 and 11, associated with runway 12 are, as shown in FIGURES 3A and 3B, mounted in elongated pipes of non-conducting material, comprising separate sections 13, 14, 15, etc.; and said separate pipe sections are coupled to one another by couplings such as 16, 17, etc., whereby the several pipe sections 13 through 15 etc., can be variably turned relative to one another. The conductors comprising the loop have been indicated in cross-section in FIGURE 3B and said conductors, designated 18 and 19 for a single one of said loops 10 or 11, can be appropriately mounted within the pipe sections, such as 13, by means of insulation 20 and/or a plastic or other insulating liner carried by the pipe section.

Lengths of said loop and pipe sections are disposed along the opposite sides of runway 12 extending outwardly, for example for 5,000 feet; and said pipe sections are either supported above, or on the ground, or buried in the ground at initial installation with the several pipe sections 13, 14, 15, etc., being variably shifted in angular position relative to one another thereby to cause the loop sections contained within each such pipe section to be variably slanted relative to a horizontal. As a result, and referring to FIGURE 1, it will be seen that a pair of loop sections 10a and 11a, located adjacent opposite sides of a runway, may be so slanted as to define (as will appear) a null position 21 comprising one point on the desired flight path. By shifting the cable loops, moreover, e.g. to slant positions such as those indicated at 10b and 11b, the null produced between the ground and airborne loops can be caused to move to a position such as 22 at some point closer in toward touchdown; and the various loop sections, by being appropriately shifted relative to a horizontal, can in fact define a successive number of null points, starting with 21 and including points such as 21a, 21b, 22, 22a, 22b, etc., thereby causing a flight path 23 (see FIGURE 2) to be generated in space and characterized by continuous successive null positions produced by successive shifting of the slant angles of the loops relative to one another and relative to the ground.

FIGURE 1 further illustrates an important feature of the present invention, i.e. that the loops 10 and 11 need not be disposed symmetrically with respect to one another adjacent opposite sides of the runway. Thus, while null point 21 in the illustration given was defined by loop sections 10a and 11a, it is possible that, due to topographical problems, it would not be convenient to locate a loop at the position occupied by loop section 11a. In such instances, the loop section could be moved to a position such as 11c; and by causing loop section 11c to be shifted to an angle of appropriate magnitude relative to the horizontal, the null position 21 could then be defined by loop sections such as 10a and 11c. Similar considerations apply of course throughout the length of the two loops 10 and 11; and the loops may within reasonable limits be variably spaced from one another and variably located relative to the runway as they extend outwardly, thereby to take into consideration built up areas, real estate problems, zoning restrictions, possible sources of interference, etc., with the proper nulls being assured merely through predisposition of the loop sections at proper slant angles.

The generation of the various nulls depicted in FIGURES 1 and 2 and comprising the flight path, will become more readily apparent from consideration of the diagrammatic showings in FIGURES 4 through 7. For purposes of explanation, loop 10 is designated "loop B" whereas loop 11 will be designated "loop A" (see FIGURE 8); and "A" and "B" shown in the various vector diagrams of FIGURES 4 through 7 are intended to refer to those two loops A and B, whereas various voltages $e_a$, $E_a$, $E_b$ and $e_b$, to be referred to in subsequent portions of this description, are intended to refer to voltages derived from the loops A and B respectively.

With this initial explanation, reference is first made to FIGURE 4 which depicts a ground loop A, and a horizontally disposed sensing loop S, corresponding to the assumed gyro-stabilized horizontal loop on an aircraft. With two such loops A and S, and assuming an induction field therebetween, it can be shown that the voltage induced in a loop such as S, due to an alternating current in a loop such as A is, for small loops:

$$e_s = K \frac{H}{D^n} \sin(\alpha + \beta - \pi/2) \quad (1)$$

where $e_s$ is the voltage induced in loop S; H is the total magnetic induction field due to the current flowing in loop A; D is the distance between loops (see FIGURE 4); the exponent $n$ is a function of the loop dimensions, and of D; $\alpha$ and $\beta$ are the angles between the planes of the loops A and S, and the line joining their centers respectively; and K is a constant.

The present invention contemplates that each of the ground loops 10 and 11 or B and A, comprises a long rectangular closed loop of desired length, e.g. 5,000 feet, with the separation between the conductors such as 18 and 19 of each loop being in the order of eight inches. Moreover, as already discussed, it is contemplated that these loops are contained within or supported upon an appropriate supporting structure, e.g. contained within a plastic pipe and secured therein or on some plastic lining. It is further contemplated, as already discussed, that the two loops are separated along opposite sides of a runway by approximately 100 to 200 feet (this being consistent with existing runway dimensions); and that the loop system be used to control the approach and landing of an aircraft during the last phases of a landing operation, i.e. during the last two to four hundred feet of descent.

By reason of these various dimensional considerations, it will be noted that each loop, such as A or B, is very long relative to the distance D (FIGURE 4). In such circumstances, therefore, an equation such as (1) above can be simplified, where the driven loop is very long in one dimension relative to distance D, as follows:

$$e_s = KH/D^2 \sin(\alpha + \beta - \pi/2)$$
$$= KH/D^2 \cos(\alpha + \beta) \quad (2)$$

Examining Equation 2 it will be seen that null coupling exists between two loops such as A and S when the sum of the angles $\alpha$ and $\beta$ equals $\pi/2$, i.e. for null coupling:

$$(\alpha + \beta) = \pi/2 \quad (3)$$

Referring now to FIGURE 5, let us assume that we have two long loops A and B; that these loops are disposed in laterally spaced relation to one another by a distance $L_1 + L_2$; and that the two loops A and B are respectively driven by currents at different frequencies $f_1$ and $f_2$. Let us further assume that a coil S is somehow disposed in space above and between both of loops A and B, being spaced from loop A by a distance $D_1$ and from loop B by a distance $D_2$. In such circumstances, the coil S will have two voltages induced therein, i.e. a voltage $e_a$ at frequency $f_1$, and a voltage $e_b$ at frequency $f_2$. By analogy to Equation 2, these two voltages $e_a$ and $e_b$ can be defined as follows:

$$e_a = KH/(D_1)^2 \cos(\theta + \phi + \beta) \quad (4)$$
$$e_b = KH/(D_2)^2 \cos(\theta_2 + \phi + \beta) \quad (5)$$

If now it be further assumed that coil S is maintained horizontal at all times, e.g. by having said coil S mounted on a gyro-stabilized platform, then the angle $\theta$ would equal angle $\beta$, in which instance Equations 4 and 5 can be simplified as follows:

$$e_a = KH/(D_1)^2 \cos(2\theta_1 + \phi) \quad (6)$$
$$e_b = KH/(D_2)^2 \cos(2\theta_2 + \phi) \quad (7)$$

wherein, as will be appreciated from examination of FIGURE 5, $\theta_1$ equals the angle of elevation of coil S from loop A; $\theta_2$ equals the angle of elevation of coil S from loop B; and $\phi$ equals the angle of tilt between the driven loops A and B and a horizontal, i.e. the tilt angle at which cables comprising loops A and B may be supported upon or buried in the ground.

By reason of the discussion given previously in derivation of Equation 3, and from examination of Equations 6 and 7, it will be seen that when $$(2\theta_1 + \phi) = (2\theta_2 + \phi) = \pi/2$$

then a double null will be produced in coil S, i.e. $e_a$ equals $e_b$ equals zero, and the distances $D_1$ and $D_2$ will be equal to one another; and it is the generation of this double null, and the defining of a flight path thereby, which comprises the crux of the present system, without regard to specific circuits or details of the ground or airborne equipment.

The derivation thus far given establishes that by tilting a pair of spaced loops, energized respectively at different frequencies, a double null can be established in a horizontal pickup coil disposed above said loops at a predetermined position which bears a fixed and determinable geometric relation to the locations of the ground loops; and the predetermined position of the sensing loop S, at which this double null will be produced, can be varied by appropriate variation in the tilt angles of one or both of ground loops A and B.

Figure 6:
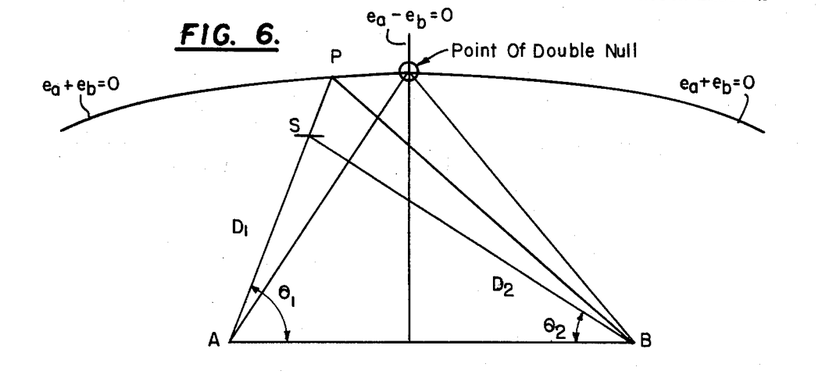

It should further be noted that if the horizontally disposed coil S is moved vertically above or below the double null position shown in FIGURE 5, voltages $e_a$ and $e_b$ will change in equal amounts and in the same sense so that the differences in these voltages will aways be zero so long as the loop S is directly at the null position or at any position vertically above or below said null position. As a result, for a given disposition of ground loops A and B, a vertical locus of points will be described wherein:

$$e_a - e_b = 0 \qquad (8)$$

and this particular locus has been depicted by the vertical line in FIGURE 6.

If the coil S should be moved laterally to the left (as viewed in FIGURE 6) from the double null point, then the term $\cos(2\theta_1 + \phi)$, will become a negative quantity inasmuch as $2\theta_1$ plus $\phi$ will be greater than $\pi/2$. For this same lateral movement to the left, $\cos(2\theta_2 + \phi)$ will become a positive quantity inasmuch as $2\theta_2 + \phi$ will be less than $\pi/2$. As a result of these considerations, and by comparison of Equations 6 and 7, it will be seen that the quantity $(e_a - e_b)$ will be negative for all points to the left of the vertical locus shown in FIGURE 6 and will be positive for all points to the right of said vertical locus.

If we therefore consider the difference in voltages produced in the horizontally disposed coil, i.e. $(e_a - e_b)$, the considerations described show that a difference voltage of zero establishes the position of the sensing coil S on the null vertical locus passing through the double null point where $e_a = e_b = 0$. A negative difference shows that we are to the left of this vertical locus in which event one must fly right to return to the vertical locus. Similarly, a positive difference will establish that we are to the right of the vertical locus in which event we must fly left to return to the vertical locus.

Figure 7:
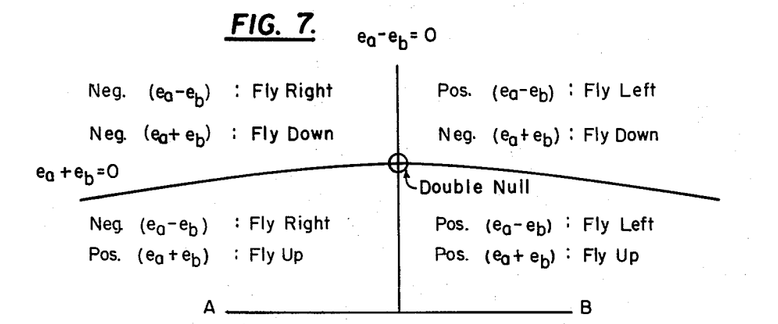

The locus of the point where $$KH/(D_1)^2 \cos(2\theta_1 + \varphi) + KH/(D_2)^2 \cos(2\theta_2 + \varphi) = 0 \qquad (9)$$

can be shown to comprise a horizontally oriented curve (see FIGURE 6) passing through the point of double null. At any point above this horizontally oriented curve, the sum $(e_a + e_b)$ will be a negative quantity having an ampltiude more or less proportional to the deviation above the horizontally disposed curve; and below the horizontally disposed curve the sum $(e_a + e_b)$ will be a positive quantity. If, therefore, in addition to monitoring the difference voltage $(e_a - e_b)$ we also monitor the sum voltage $(e_a + e_b)$ the instantaneous relationship between these sum and difference voltages will always indicate just where we are above, below, to the right, or to the left, of the double null point; and this in turn will provide necessary information determining just what maneuver must be effected to return to the point of double null. The characteristic voltages, and the required maneuvers, for all possible conditions, are shown in the illustrative diagram of FIGURE 7. As a result of this consideration, therefore, a system constructed in accordance with the present invention can, by differently energizing two appropriately tilted ground loops, determine a position in space at which a double null will be detected by a horizontally oriented coil; and a vertical error or displacement signal can be derived by monitoring the sum voltages effected in such a coil, while a horizontal displacement or error signal can be provided by monitoring the difference voltages generated in such a coil.

The overall development in FIGURES 5 through 7 thus establishes the basic principles upon which the present invention is predicated, i.e. the establishment, by geometrical principles, of a double null position in space (comprising e.g. a point on the flight path) which position is determined for each point by the tilt angle of ground loops, and which position can be varied along the projected flight path by appropriate variation in tilt angle of the ground loops. Moreover, in such an arrangement, constructed in accordance with the present invention, one can determine location above or below, and to the right or left, of the predetermined double null so established by monitoring certain sum and difference voltages respectively established in a sensing loop structure.

Figure 8:
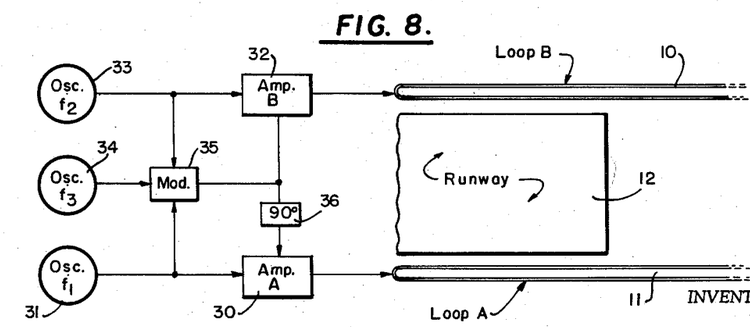
FIGURE 8 is a block diagram and diagrammatic representation of ground equipment utilized in generating induction fields defining the flight path of the present invention.
Figures 9, 10:
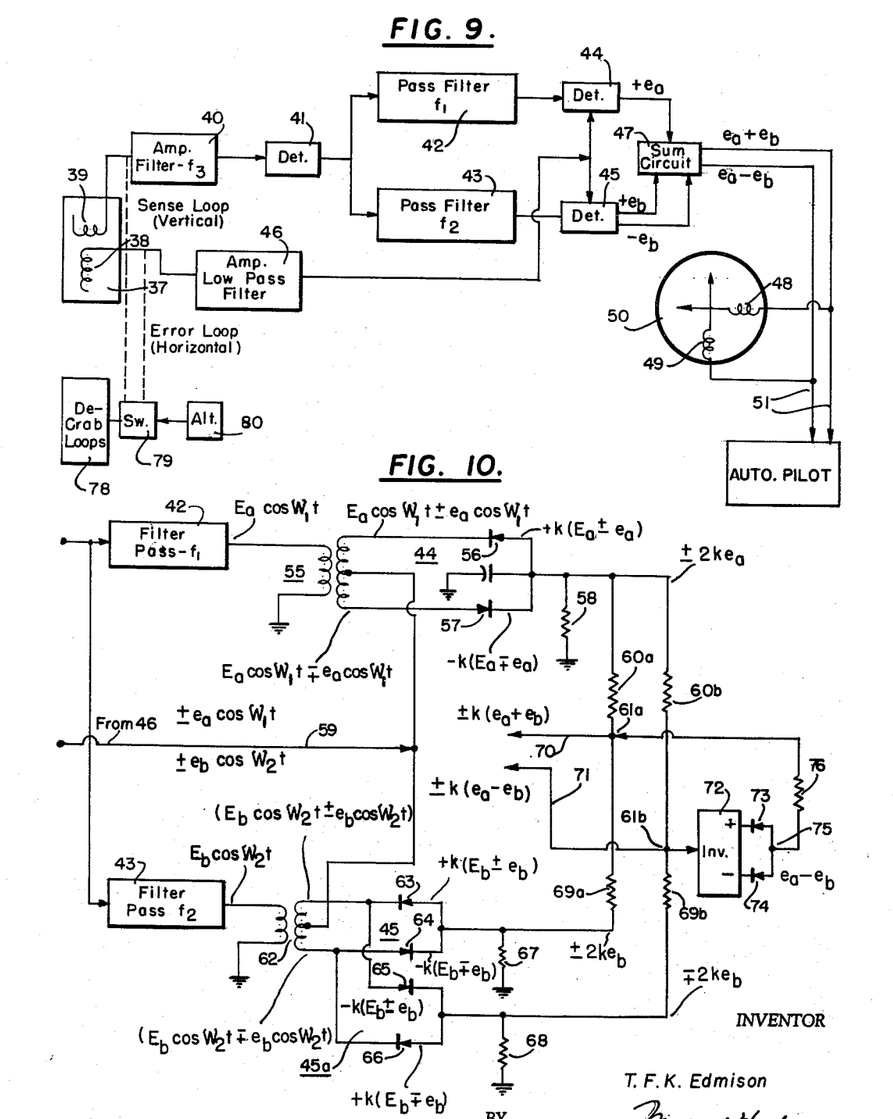
FIGURE 9 is a block diagram of one form of airborne equipment which may be employed to interpret the information generated by the ground equipment of FIGURE 8.
FIGURE 10 is a detail view of a portion of the airborne equipment shown in FIGURE 9.

Referring now to FIGURES 8 through 10, it will be seen that the ground equipment may comprise, as already described, a pair of loops 10 and 11 disposed adjacent and extending outwardly from opposite sides of runway 12, and having successively varied tilt angles appropriately predetermined to establish a desired flight path or approach path relative to runway 12. Loop A (11) is energized via amplifier 30 from an oscillator 31 operating for example at a frequency such as 1190 cycles/second. Loop B (10) is similarly energized via amplifier 32 from a second source of oscillations 33 having a frequency such as 1453 cycles/second. The current in ground loop A may be represented by the equation: $I_a \sin \omega_1 t$, whereas the current in loop B is $I_b \sin \omega_2 t$, where $I_a$ is current in loop A; $I_b$ is the current in loop B; $\omega_1$ equals $2\pi f_1$ ($f_1$ being the frequency of the current in loop A), and $\omega_2$ equals $2\pi f_2$ ($f_2$ being the frequency of the current in loop B).

As will appear hereinafter, and for reasons already discussed, the currents in the ground loops 10 and 11 produce induction fields which in turn generate signals in the aircraft loop system; and these aircraft generated signals are then employed to effect error voltages necessary for operation of an automatic pilot system or the like, serving to return the aircraft to the double null position already discussed when said aircraft is off of said double null position. The currents generated in the ground loops cause, for reasons already discussed, a signal $e_a$ and a signal $e_b$ to be generated in the aircraft horizontal sensing loop system wherein:

$$e_a = KH/(D_1)^2 \cos(2\theta_1 + \varphi) \cos \omega_1 t$$
and
$$e_b = KH/(D_2)^2 \cos(2\theta_2 + \varphi) \cos \omega_2 t$$

The derivation of the formulas given directly above will be apparent from reference to Equations 6 and 7. K is, of course, a constant; $D_1$ and $D_2$ represent the distance between the ground loops and sensing coil system (see FIGURE 5) and $$H = kI_a N s$$
$$= kI_b N s$$

where $k$ is a constant; $N$ is the number of turns in the ground loop; and $s$ is the separation between the conductors of the ground loop.

The energization system is so chosen that $I_a$ equals $I_b$. Moreover, as will be apparent from the foregoing discussion, the factor H is subject to the separation, $s$, between conductors; and $s$ may be appropriately varied between loop sections (see FIGURE 3A) to control the relative deflection sensitivity of the overall system as the aircraft approaches point of touchdown.

As will appear hereinafter, the aircraft loop system comprises not only a horizontal coil but also a vertical coil, with this pair of coils being maintained in horizontal and vertical position respectively by an appropriate gyro system. Signals detected by both said coils are, as will also appear, amplified by broad band linear amplifiers and then rectified by a phase coherent detector so that D.C. voltages are generated proportional in amplitudes to the magnitudes of $e_a$ and $e_b$, and with a polarity corresponding to the coefficient of $e_a$ and $e_b$. There is no intentional phase shift in the system; and the only phase of real concern is an in-phase or anti-phase condition relative to some arbitrary reference signal. As a result, the significance of $+e_a$ is that it is in phase with such a reference signal while $-e_a$ is anti-phase to the reference signal.

Reference A.C. voltages are provided to operate the phase coherent error detector already mentioned, and such reference signals are provided (see FIGURE 8) by an oscillator 34 operating at a frequency $f_3$ (e.g. 20 kc.) which is in turn amplitude modulated in a modulator 35 by the outputs of both of oscillators 31 and 33. The resultant modulated signal so produced at the output of modulator 35 is applied directly to amplifier 32 and thence to loop 10; and is also applied via a 90-degree phase shifter 36 to amplifier 30 and thence to loop 11. As a result, loops 10 and 11 are energized not only by the primary frequencies $f_1$ and $f_2$ produced by oscillators 31 and 33, but also by a higher reference frequency $f_3$, modulated with frequencies $f_1$ and $f_2$, and applied to said loops in a 90-degree out-of-phase relationship.

It should be noted that, while the diagrammatic illustration of FIGURE 8 depicts a direct coupling arrangement between sources 31, 33, and 34, and loops 10 and 11, the arrangement is intended to include transformer coupling arrangements as well. By way of example, the outputs of sources 31 and 33, and of modulator 35, could be coupled respectively to three different transformer primaries. Three secondary windings could also be provided for these three primary windings, with the modulator output secondary winding having its opposite ends connected to center taps on the other two secondary windings respectively. With such an arrangement, phase shifter 36 can be eliminated; and the outermost ends of loops 10 and 11 can be interconnected thereby to permit frequency $f_3$ to be driven around one large loop comprising loop A and loop B as its sides (commonly referred to as "phantom" connection). Such an arrangement increases $f_3$ signal strength, and reduces the power requirements of source 34. Still further variations in coupling will be apparent to those skilled in the art.

The vertical loop mounted on the aircraft sensor mentioned previously, is designed to intercept and separate the modulated $f_3$ frequencies. This $f_3$ signal will have no null so that, upon rectification, signals at the modulation frequencies $f_1$ and $f_2$ are provided from the vertical aircraft loop which do not change polarity anywhere in the induction field of the loop system. This constant polarity frequency, provided by the vertical sensing loop of the aircraft loop system, thus provides, on rectification, a separated amplitude coefficient which contains the voltages $\cos \omega_1 t$ and $\cos \omega_2 t$; and these signals are then separately applied via filters to the phase coherent detectors, thereby to provide the constant polarity reference signal mentioned previously.

This general operation of the airborne system is shown in FIGURE 9, wherein 37 represents a gyro system for stabilizing the aircraft sensor, and carrying thereon a horizontally disposed error loop 38 and a vertically disposed sense loop 39. The vertical sense loop 39 is coupled via an amplifier and filter 40 designed to pass signals only at frequency $f_3$ (and its modulation components). The output of amplifier 40 is then coupled to a detector 41 which separates the frequencies $f_1$ and $f_2$ from the carrier frequency $f_3$; and these frequencies $f_1$ and $f_2$ are then passed via filters 42 and 43 respectively to a pair of detectors 44 and 45. The horizontal error loop 38 has its output coupled via an amplifier and low pass filter 46, designed to pass signals at the relatively low frequencies $f_1$ and $f_2$ but to block frequencies at the higher frequency $f_3$; and the output of amplifier and filter 46 is thence also coupled to detectors 44 and 45.

Detector 44, as will appear hereinafter, provides an output which is proportional to $+e_a$, whereas detector 45 provides a pair of outputs proportional respectively to $+e_b$ and $-e_b$. These three signals are then coupled to a summing circuit 47 which provides a pair of outputs proportional respectively to $(e_a+e_b)$ and $(e_a-e_b)$. These signals, for reasons already discussed, define by their relative polarities the position of the sensing loop system 37–39 relative to the double null point (FIGURES 6 and 7) and further contain information necessary to determine whether the aircraft is required to fly up or down, right or left, to return to the double null point when it has deviated therefrom.

The two outputs of summing circuit 47 may be applied to coils 48 and 49 respectively of a cross-pointer indicator 50, thereby to give a visual indication of the location of the craft relative to the desired flight path, permitting manual correction of aircraft position, if such be desired. In addition, or in the alternative, said two outputs of sum circuit 47 may be applied via lines 51 to the auto-pilot mechanism of the craft, thereby to effect automatic maneuvering of the aircraft along the predefined flight path.

The general operation of the circuit shown in FIGURE 9 will become more readily apparent from the detailed schematic showing of FIGURE 10; and for purposes of relating FIGURES 9 and 10, like numerals have been used in FIGURE 10 insofar as they are relevant. The output of filter 42 may, as indicated, be represented by the equation: $E_a \cos \omega_1 t$, wherein $E_a$ is used to indicate the voltage derived due to demodulation of previously modulated frequency $f_3$, and is thereby distinguished from $e_a$ which is used to represent the voltage due to direct energization of loop A from oscillator 31 via amplifier 30. The voltage so derived from filter 42 is coupled via transformer 55 to phase coherent detector 44 comprising a pair of diodes 56 and 57 connected in opposite polarity to one another between the secondary of transformer 55 and a load resistor 58. A center tap on the secondary of transformer 55 is driven by the output of low pass filter 46; and the signals so coupled to detector 44 from the amplifier and low pass filter 46 are indicated in FIGURE 10 adjacent coupling line 59.

The various signals which are impressed on diodes 56 and 57, and which appear at the output of said diodes across load 58, have been somewhat simplified in FIGURE 10 for ease of explanation. As a practical matter, it will be noted that line 59 carries signals derived from both of ground loops 10 and 11; but the output across the load 58 of detector 44 is primarily one which is governed by signals radiated by loop 11 (loop A), with no significant effect being noted in the signal across load 58 due to signals from loop 10 (loop B). In order to appreciate this, it should be noted that, due to the signals appearing on line 59, and at the primary of transformer 55, the actual voltage impressed upon rectifier 56 can be represented as:

$$E_a \cos \omega_1 t \pm e_a \cos \omega_1 t \pm e_b \cos \omega_2 t$$
$$= (E_a \pm e_a) \cos \omega_1 t \pm e_b \cos \omega_2 t$$

If $E_a$ be so chosen that it is much greater than either $e_a$ or $e_b$ the waveform of the immediately preceding equation takes the form of a carrier wave, modulated by a sinewave having the form $e_b \sin (\omega_1-\omega_2)t$. The output current of diode 56 can then be represented by the equation:

$$I_{56}=+k[E_a \pm e_a \pm e_b \sin (\omega_1-\omega_2)t]$$

By similar analysis, it will be found that the current output from diode 57 can be represented by the equation:

$$I_{57}=-k[E_a \mp e_a \mp e_b \sin (\omega_1-\omega_2)t]$$

The combined current passing to common load 58 therefore produces a voltage which takes the form:

$$\pm 2ke_a \pm 2ke_b \sin(\omega_1-\omega_2)t$$

The last term of the preceding equation goes positive and negative at a frequency:

$$\frac{\omega_1-\omega_2}{2\pi}=f_1-f_2$$

In effect, therefore, it represents a ripple current whose sign is of no importance; and as a practical matter the last term of the equation can be disregarded because of the linearity of diodes such as 56 and 57, and because in addition the devices driven by the output of detector 44, e.g. meter 50 or the aircraft auto-pilot, normally have filtering devices built into them which would eliminate the frequency $f_1-f_2$. The output of the detector 44 across load 58 is, therefore, as represented in FIGURE 10, i.e. $\pm 2ke_a$; and this voltage is coupled via resistors 60a and 60b to a pair of junction points 61a and 61b (comprising portions of the summing circuit 47 shown in FIGURE 9).

The output of filter 43 is similarly coupled via transformer 62 to a phase coherent detector 45 comprising diodes 63 and 64. In addition, detector 45 includes a section 45a comprising diodes 65 and 66 which are reversed in polarity to diodes 63 and 64, thereby to provide still another output. These two outputs from detector 45-45a appear across loads 67 and 68 respectively and take the form, across load 67, of $\pm 2ke_b$ and, across load 68, the form $\mp 2ke_b$. These two outputs are similarly coupled via resistors 69a and 69b to the aforementioned junctions 61a and 61b.

The voltages so derived from the two detectors 44 and 45-45a are summed, and thereafter appear on line 70 (coupled to junction 61a) as $\pm k(e_a+e_b)$, and on line 71 (coupled to junction 61b) as $\pm k(e_a-e_b)$. By this system therefore it will be noted that line 70 carries a voltage which is proportional to the sum of the received signals at the two frequencies, whereas line 71 carries a voltage which is proportional to the difference in voltages of the received signals at the two frequencies; and the actual polarities of these sum and difference voltages, e.g. $\pm k$, uniquely determine just where the craft is in relation to the double null (see FIGURE 7). The voltages on lines 70 and 71 can, therefore, be coupled as shown in FIGURE 9 to a meter such as 50 or to an auto-pilot, thereby permitting manual or automatic maneuvering of the craft back to the double null when the craft somehow deviates therefrom.

It will be recalled by refernce to FIGURE 7 that the horizontal locus $(e_a+e_b=0)$ exhibits a droop; and as a result, rather wide deviations from the double null in a horizontal direction produce significant lateral error signals. In order to compensate for this droop, the output of junction 61b may be coupled to an inverter 72 and thence, via a pair of diodes 73 and 74 (arranged to assure that the output at junction 75 is always a positive quantity) to a voltage-dependent resistor 76 and thence to junction 61a. The voltage difference output at junction 61b is thereby applied through the non-linear element or voltage-dependent resistor 76 to the voltage sum terminal 61a so as to effect a "fly-up" bias to the sum channel 70. By this arrangement therefore the device compensates for the noted droop in the horizontal null locus, and in addition provides extra fly-up demand for excessive off-course conditions.

As has already been mentioned, the present invention may be employed not only to provide a flight path and approach control for an aircraft, but can in fact be employed to effect "de-crab," e.g. can be utilized to correct a drift angle in the aircraft just prior to touchdown thereof on the runway. A system effecting this type of operation has also been illustrated in FIGURE 9. In particular, de-crab can be accomplished by using two sets of sensor loops on the aircraft, one disposed at a fore portion of the aircraft and the other at the aircraft center axis of pitch and roll; and these two sets of loops can be used to feed control information showing the drift angle of the craft. During a landing operation, the center set of loops would be initially employed to guide the craft so that the center set of loops would be located on the flight path and over the center line of the runway; and the fore set would, during a (cross wind) landing operation, be disposed upwind slightly to keep the craft on the runway center line.

In the arrangement of FIGURE 9, therefore, during a landing under cross wind conditions, the loops 38 and 39 can be considered to comprise the center set of loops; and would operate, during initial stages of the approach, in the manner already described, i.e. to keep the center portion of the aircraft on the flight path and center line of the runway. The second set of loops, or fore loops, designated 78, would, during these initial approach stages, be inoperative; being operatively substituted for center loops 38–39 during the final stages of a landing operation. In particular, fore loops 78 could be coupled via switch 79 to the inputs of filters 40 and 46 during said final stages of a landing operation, and this switching of loops 78 could be under the control of an altimetric device 80 operative to substitute loops 78 for loops 38–39 when the aircraft is approximately 15 to 20 feet or less from the runway. The substitution of the fore set of loops 78 for the center set of loops 38 and 39 would therefore cause the nose of the craft to be repositioned onto the center line of the runway to accomplish de-crab as the final stage of the landing operation. As already described, the spacing between the cables comprising a single loop can be reduced in the runway regions wherein such de-crabbing operations would occur so that the final de-crabbing operation can be accomplished with extreme accuracy and much sensitivity.

It should also be noted that while the preceding discussion has primarily contemplate providing control information for final approach, flare-out, touchdown, and landing roll-out, the loop system can be extended considerably to provide guidance control of the aircraft right into the ramp. In such circumstances, of course, the loops 10 and 11 already described, or similar such loops, could extend along the runways to the ramp; or could be installed at turn-off points on the runway for tower control. After a landing roll has been completed, using the main loops A and B, therefore, these additional loop sections, which could be termed taxi way cables, could be turned on at the tower so as to automatically guide the aircraft (while taxiing) along the selected taxiway and to the individual ramp position under conditions of dense fog, heavy snow, or other zero-zero conditions.

The basic feature of the present invention resides in the generation of an approach or flight path defined by null-null coupling conditions between the horizontally stabilized airborne pick-up loop and both of said inclined ground loops; for by such an arrangement, providing said null-null coupling, the flight path is defined and stabilized in position without regard to possible maladjustments or imbalance in either the ground or airborne equipment. In this respect, therefore, the system of the present invention differs materially from other so-called null systems suggested heretofore; for in these prior systems a null is achieved by addition and cancellation of signals within the airborne equipment, rather than by null coupling to the equipment itself, whereby the flight path in these prior systems is subject to errors and deviations if the airborne or ground equipment is maladjusted. Errors of this type are completely obviated by the present invention.

While I have thus described a preferred embodiment of the present invention, many variations will be suggested to those skilled in the art. By way of example, rather than driving the two ground loops at different frequencies, said ground loops may be driven at the same frequency but 90° out of phase. Either of the two phases could then be used to modulate the carrier $f_3$. With this particular type of ground signal, the two filters in the aircraft receiver sensing circuit can be replaced by a 90° phase shifter feeding one of the phase coherent detectors; and since a phase coherent detector gives zero output when the error signal is in quadrature to the reference voltage, this arrangement will still separate the two signal components due to the currents in the two ground loops. Indeed, the detector outputs will (except for the ripple voltage) be identical to that already described for the different frequency energizations $f_1$ and $f_2$; but would have a potential advantange in that the error signal amplifier could be operated with a very narrow band (e.g. 10 cycles) thereby improving the signal-to-noise ratio of the system while maintaining a common channel for the error signals.

Still other variations will be apparent to those skilled in the art; and some have already been described. It must therefore be emphasized that the foregoing description is meant to be illustrative only and should not be considered limitative of my invention. All such variations and modifications as are in accord with the principles described are meant to fall within the scope of the appended claims.

Having thus described my invention, I claim:

1. An aircraft approach control system adapted to provide control information for guiding an aircraft toward a landing location, comprising a pair of elongated loops extending along the ground outwardly from said landing location and in spaced relation to one another thereby to define an approach controlled region therebetween, said loops being angularly inclined to the horizontal for at least a portion of their length, the angular inclinations of said loops being successively changed along the directions of elongtion of said loops, and means for energizing said loops with alternating currents to provide intersecting induction fields between said loops having a detectable characteristic changing in position through said approach controlled region in relation to the changing angular inclination of said loops.

2. The system of claim 1 wherein said loops are energized by different frequency alternating currents of relatively low repetition rate, each of said loops also being energized by a higher frequency alternating current modulated by both said relatively low different frequencies.

3. The system of claim 1 wherein each of said loops comprises a plurality of elongated individually supported and electrically interconnected loop sections, the angular inclination of said loops being changed from loop section to section thereof.

4. An aircraft approach control system adapted to provide control information for guiding an aircraft toward a landing location, comprising a pair of elongated inclined loops extending along the ground, outwardly from said landing location, and in spaced relation to one another thereby to define an approach controlled region therebetween, and means for energizing each of said loops with an alternating current, said loops being energized to produce characteristic induction fields intersecting in space and having nulls, detectable in space by a horizontally stabilized error sensing coil, at particular positions between said ground loops related to both the spacing and angular inclination of said loops, the angular inclinations of said loops being successively changed along the directions of elongation of said loops thereby to cause the positions of said nulls to occur at successive predetermined positions forming an aircraft approach path in said approach controlled region.

5. The system of claim 4 including a first frequency source energizing one of said loops, a second frequency source energizing the other of said loops, a carrier source having a frequency higher than said first and second frequencies, means for modulating the output of said carrier source with said first and second frequencies, and coupling means for also energizing both said loops with said modulated carrier.

6. The system of claim 5 wherein said coupling means includes phase shifter means for coupling said modulated carrier to said pair of loops in quadrature phase relationship.

7. An aircraft approach control system comprising a pair of elongated substantially rectangular loops extending along the ground in spaced relation to one another, the planes of said loops being inclined to horizontal, and means for energizing said loops to produce fields in space detectable by pick-up means on an aircraft, the inclination and energization of said loops being such that both the sum and difference of signals radiated by said loops produce error signal outputs from said pick-up means when said pick-up means deviates in position from substantially a single predetermined point of double null coupling between said pick-up means and said pair of loops respectively; said point of double null coupling being located in space in a given plane extending transverse to the planes of said inclined ground loops.

8. The arrangement of claim 7 wherein the angle of inclination of at least one of said loops is successively different in the direction of elongation of said loop, whereby the position of said predetermined point of double null coupling changes in successive ones of said transverse planes.

9. An aircraft approach control system comprising a pair of elongated radiators extending along the ground in spaced relation to one another, said radiators being located along, and extending outwardly from, opposite sides of an aircraft landing runway, said radiators comprising elongated loops at least one of which has successive loop sections positioned at varying inclinations to horizontal, means for energizing said radiators with different signals respectively to produce control fields in space between said radiators, horizontally and vertically positioned pick-up means on an aircraft located in said fields, means coupled to both said pick-up means for producing a first control signal related to the sum of the signals produced by said ground radiators at the existing location, of said pick-up means, further means coupled to both said pick-up means for producing a second control signal related to the difference of the signals produced by said ground radiators at said existing location of said pick-up means, and means responsive to both said first and second control signals for locating said pick-up means and thereby said aircraft relative to said spaced ground radiators.

10. The system of claim 9 wherein said control signal responsive means comprises an indicator.

11. The system of claim 9 wherein said control signal responsive means comprises means for automatically maneuvering said aircraft.

12. The system of claim 9 wherein said pick-up means comprise first pick-up means located at a fore portion of said aircraft, second pick-up means located near the center of pitch and roll of said aircraft, and means for switching from one to the other of said first and second pick-up means.

13. The system of claim 9 including gyro-stabilizing means for maintaining the horizontal and vertical orientation of said pick-up means.

14. An aircraft approach control system adapted to guide an aircraft toward a runway, comprising a pair of elongated loops extending outwardly from said runway in spaced relation to one another thereby to define an approach controlled region therebetween, means for energizing each of said loops with a signal, said loops being energized by different signals respectively to produce characteristic fields in space having field nulls between said loops related at least in part to the relative angular inclination of said loops, the angular inclination of at least one of said loops being successively changed along the direction of elongation of said loop thereby to cause the positions of said nulls to occur at successive predetermined positions forming an aircraft approach path toward said runway.

15. An aircraft approach control system for guiding an aircraft comprising a pair of elongated substantially rectangular inclined loops extending along the ground in spaced relation to one another thereby to define an aircraft control region therebetween, means for energizing each of said loops with a characteristic signal, said loops being energized by different signals respectively to produce characteristic intersecting fields having field nulls between said loops, detectable by pick-up means on an aircraft, and related at least in part to the angular inclination of at least one of said loops, the angular inclination of said loop being changed in increments along the direction of elongation of said loop thereby to cause the position of said nulls to occur at successive predetermined positions forming an aircraft guidance path.

16. An aircraft control system comprising at least one elongated substantially rectangular loop extending along the ground, means for energizing said loop, aircraft pick-up means stabilized in a horizontal orientation and disposed on an aircraft for intercepting the field radiated by said ground loop, and means coupled to said pick-up means for producing an aircraft positional control signal related at least in part to the angular inclination of said loop relative to said stabilized pick-up means, the angular inclination of said ground loop being different at different positions along its direction of elongation.

17. An aircraft approach control system for guiding an aircraft comprising a pair of elongated loops extending along the ground in spaced relation to one another, said loops being inclined to the horizontal and to one another and defining an aircraft control region therebetween, and means for energizing each of said loops, said loops being energized by different characteristic signals respectively to produce a pair of distinguishable fields in space each of which fields has null coupling, to a positionally stabilized pick-up means on an aircraft, at a particular point in space determined by the angular inclinations of said loops, whereby said particular point in space is characterized by a double null coupling between said pick-up means and both of said pair of ground loops, the angular inclination of at least one of said loops being changed along the direction of elongation of said loop thereby to cause said point of double null coupling to occur at successive different positions forming an aircraft guidance path between said loops along their directions of elongation.

References Cited in the file of this patent

UNITED STATES PATENTS

| | | |
|---|---|---|
| 1,435,941 | Robinson | Nov. 21, 1922 |
| 2,224,863 | Dingley | Dec. 17, 1940 |
| 2,340,282 | Dingley | Jan. 25, 1944 |
| 2,859,426 | Davis | Nov. 4, 1958 |